US 9,248,456 B2

(12) United States Patent
Ford et al.

(10) Patent No.: US 9,248,456 B2
(45) Date of Patent: Feb. 2, 2016

(54) CENTRIFUGAL SEPARATOR WITH EXTENDED POST

(71) Applicants: Steven David Ford, Fresno, CA (US); Jeremy Benjamin Isch, Fresno, CA (US); Timothy Alan Raiskup, Clovis, CA (US)

(72) Inventors: Steven David Ford, Fresno, CA (US); Jeremy Benjamin Isch, Fresno, CA (US); Timothy Alan Raiskup, Clovis, CA (US)

(73) Assignee: Claude Laval Corporation, Fresno, CA (US)

( * ) Notice: Subject to any disclaimer, the term of this patent is extended or adjusted under 35 U.S.C. 154(b) by 508 days.

(21) Appl. No.: 13/759,754

(22) Filed: Feb. 5, 2013

(65) Prior Publication Data

US 2014/0221186 A1    Aug. 7, 2014

(51) Int. Cl.
| | |
|---|---|
| *B04C 5/04* | (2006.01) |
| *B04C 5/181* | (2006.01) |
| *B04B 7/00* | (2006.01) |
| *B04C 5/107* | (2006.01) |
| *B04C 5/185* | (2006.01) |

(52) U.S. Cl.
CPC . *B04C 5/04* (2013.01); *B04C 5/107* (2013.01); *B04C 5/181* (2013.01); *B04C 5/185* (2013.01); *B04B 7/00* (2013.01)

(58) Field of Classification Search
CPC .......... B04C 5/04; B04C 5/185; B04C 5/181; B04C 5/107; B04C 5/30; B04C 5/085; B04B 7/00

USPC ........................................................ 494/35, 37
See application file for complete search history.

(56) References Cited

U.S. PATENT DOCUMENTS

| | | | | |
|---|---|---|---|---|
| 5,368,735 A | * | 11/1994 | Ford ................... | B01D 21/2411 209/733 |
| 7,510,597 B2 | * | 3/2009 | Tee ......................... | B01D 45/16 55/423 |
| 2011/0294643 A1 | * | 12/2011 | Ford ........................ | B04C 5/04 494/56 |
| 2012/0187032 A1 | * | 7/2012 | Davey ..................... | B04C 5/103 210/197 |

FOREIGN PATENT DOCUMENTS

| | | | | | |
|---|---|---|---|---|---|
| GB | 477621 A | * | 1/1938 | ............ | B04C 5/185 |
| NL | WO 2005089950 A1 | * | 9/2005 | ............ | B01D 45/16 |

* cited by examiner

*Primary Examiner* — Charles Cooley
*Assistant Examiner* — Shuyi S Liu
(74) *Attorney, Agent, or Firm* — R. Scott Kimsey, Esq.; Klein DeNatale Goldner

(57) ABSTRACT

A centrifugal separator includes a separation barrel with an upper end, a lower end, a central axis, and a cylindrical wall defining a separation chamber. A spin plate extends substantially across the separation chamber adjacent to the lower end thereof. A post including a central passage extends from the spin plate along the central axis of the separation barrel. The post includes at least one opening for fluid to flow from the central passage of the post to the separation chamber. An inlet in fluid communication with the separation chamber allows solids-laden fluid to flow into the separation chamber. An outlet in fluid communication with the separation chamber allows substantially-clean fluid to flow out of the separation chamber and out of the device.

4 Claims, 4 Drawing Sheets

CENTRIFUGAL SEPARATOR WITH EXTENDED POST

RELATED APPLICATIONS

Not Applicable.

BACKGROUND OF THE INVENTION

1. Field of the Invention

The present invention relates generally to a centrifugal separator and more specifically to a centrifugal separator having a spin post extending beyond the spin plate thereof.

2. Background

Centrifugal separators are well known for separating solids from flowing streams of water in which they are entrained. The classical arrangement is to inject the stream from a nozzle tangentially into a cylindrical separation barrel. As the stream whirls around the wall of the separation barrel, the high g forces within the stream cause the solid particles to migrate toward the wall as the whirling stream flows from an upper elevation to a lower elevation in the separation barrel. At or near the lower end of the separation barrel there is a spin plate that reflects the central portion of the tubular-shaped whirling stream upwardly toward a central exit port. This central portion of the stream is substantially free from solids in a properly designed and properly operated centrifugal separator.

Solids nearer the wall of the separator barrel pass through a slot near the spin plate, either through or at the lower end of the separation barrel. These solids form part of the out portion of the stream, which is contiguous to the wall.

Separation devices of this type are frequently used to separate solid particles over a large range of sizes. Devices using these principles range in size from as small as parts cleaners for use in automobile service bays, to large factory installations for separating crop washings and floor sweepings from wash water, to removal of grit from very large water distribution and irrigation systems.

Such systems are generally passive, and the function and efficiency of the system derives in large part from the velocity and smoothness of the flow of the stream in the separator. Turbulence anywhere in the system, or inefficiency in the introduction of the stream into the separation barrel, will result in the need for more power (higher injection pressure), or a reduction in the efficiency of separation.

Existing centrifugal separators may include a spin plate for aiding rotation within the separation chamber. In some cases, however, the vortex created within the separation chamber moves away from the center of the spin plate. This is particularly true at lower flow rates. Further, particles may enter the central region of the vortex within the separation chambers, and once particles enter that region it is difficult to remove them before they leave the top of the separation chamber.

SUMMARY OF THE INVENTION

The present invention provides a centrifugal separator including a separation barrel with an upper end, a lower end, a central axis, and a cylindrical wall defining a separation chamber. A spin plate extends substantially across the separation chamber adjacent to the lower end thereof. A post including a central passage extends from the spin plate along the central axis of the separation barrel. The post includes at least one opening for fluid to flow from the central passage of the post to the separation chamber. An inlet in fluid communication with the separation chamber allows solids-laden fluid to flow into the separation chamber. A first conduit in fluid communication with the separation chamber allows sub-stantially-clean fluid to flow out of the separation chamber and out of the device.

In another embodiment of the invention, a cylindrical wall extends around the separation barrel, defining an acceptance chamber above the separation barrel and a collection chamber below the acceptance chamber.

In another embodiment of the invention, a second conduit extends from the bottom of the post and is in fluid communication therewith. The conduit extends to an upper portion of the collection chamber such that fluid from the collection chamber can flow through the second conduit, into the post, and enter the separation chamber via at least one opening in the post.

In still another embodiment of the invention, an annular plate extends around a perimeter of the separation barrel between the acceptance chamber and the collection chamber, the annular plate being in fluid-sealing engagement with the separation barrel and the cylindrical wall.

Another embodiment of the invention provides a centrifugal separator having a separation barrel with an upper end, a lower end, a central axis, and an internal circularly cylindrically axially-extending wall defining a separation chamber. A spin plate extends substantially across the separation chamber adjacent to the lower end thereof. A post having a central passage extends from the spin plate along the central axis of the separation barrel. The post defines at least one opening along the length thereof for allowing fluid to flow from the central passage of the post into the separation chamber. An inlet in fluid communication with the separation chamber allows for the flow of solids-laden fluid thereinto. A first conduit in fluid communication with the separation barrel allows the flow of substantially clean fluid out of the separation chamber. A second conduit extends from the bottom of the post, in fluid communication therewith, to an upper portion of the collection chamber at a point higher than the at least one opening defined by the post. The top of the second conduit is open so that fluid in the collection chamber can flow into the second conduit and be delivered to the separation chamber. A plurality of spaced-apart fins are attached to the post at a point beneath the spin plate.

In another embodiment of the device, at least one of the plurality of spaced-apart fins includes a notch in an upper edge thereof.

In another embodiment of the invention, the upper end of the post is capped.

Another embodiment of the invention provides a method of separating particulates from a solids-laden fluid stream. The method includes the step of introducing a solids-laden fluid stream into a centrifugal separator. The centrifugal separator includes a separation barrel defining a separation chamber in which the solids-laden fluid stream rotates, separating particulates by centrifugal force. The centrifugal separator also includes a cylindrical wall extending around the separation barrel and defining a collection chamber below the separation barrel and along a length thereof, between the separation barrel and the cylindrical wall. A post extends along the central axis of the separation chamber and centers the rotating fluid stream. The post includes a central passage and defines at least one opening therein. A conduit extends from a point in the collection chamber to the post, and is in fluid communication with the post. The method further includes the step of allowing partially-clarified fluid in the collection chamber to re-enter the separation chamber by traveling along the conduit and exiting the post through the at least one opening in the post. The fluid entering the separation chamber is then further separated by centrifugal force. Finally, the method includes the step of drawing clarified fluid from the separation chamber.

DETAILED DESCRIPTION OF THE INVENTION

Figure 1:
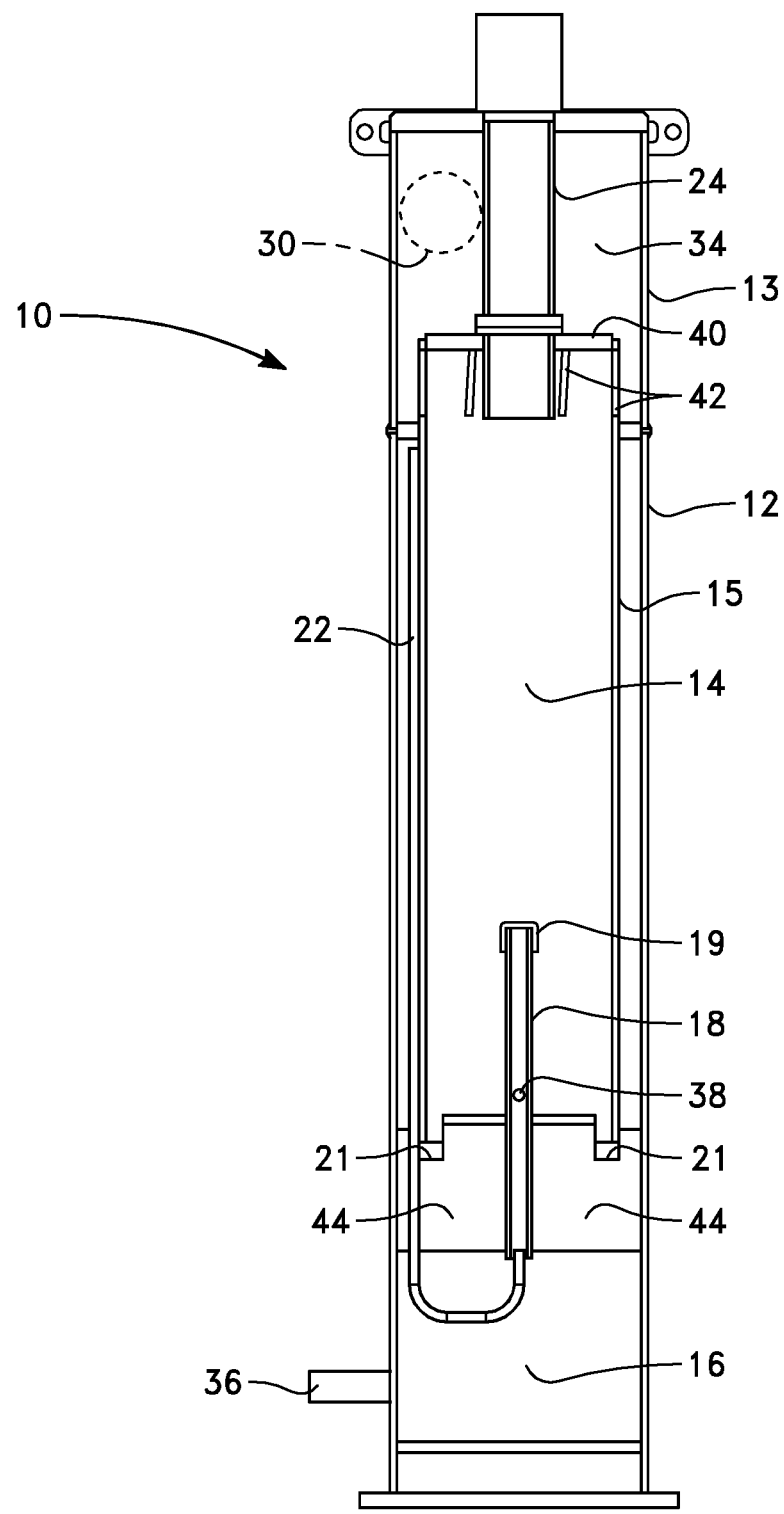
FIG. 1 is a partially cut-away side view of one embodiment of a centrifugal separator of the present invention.
Figure 2:
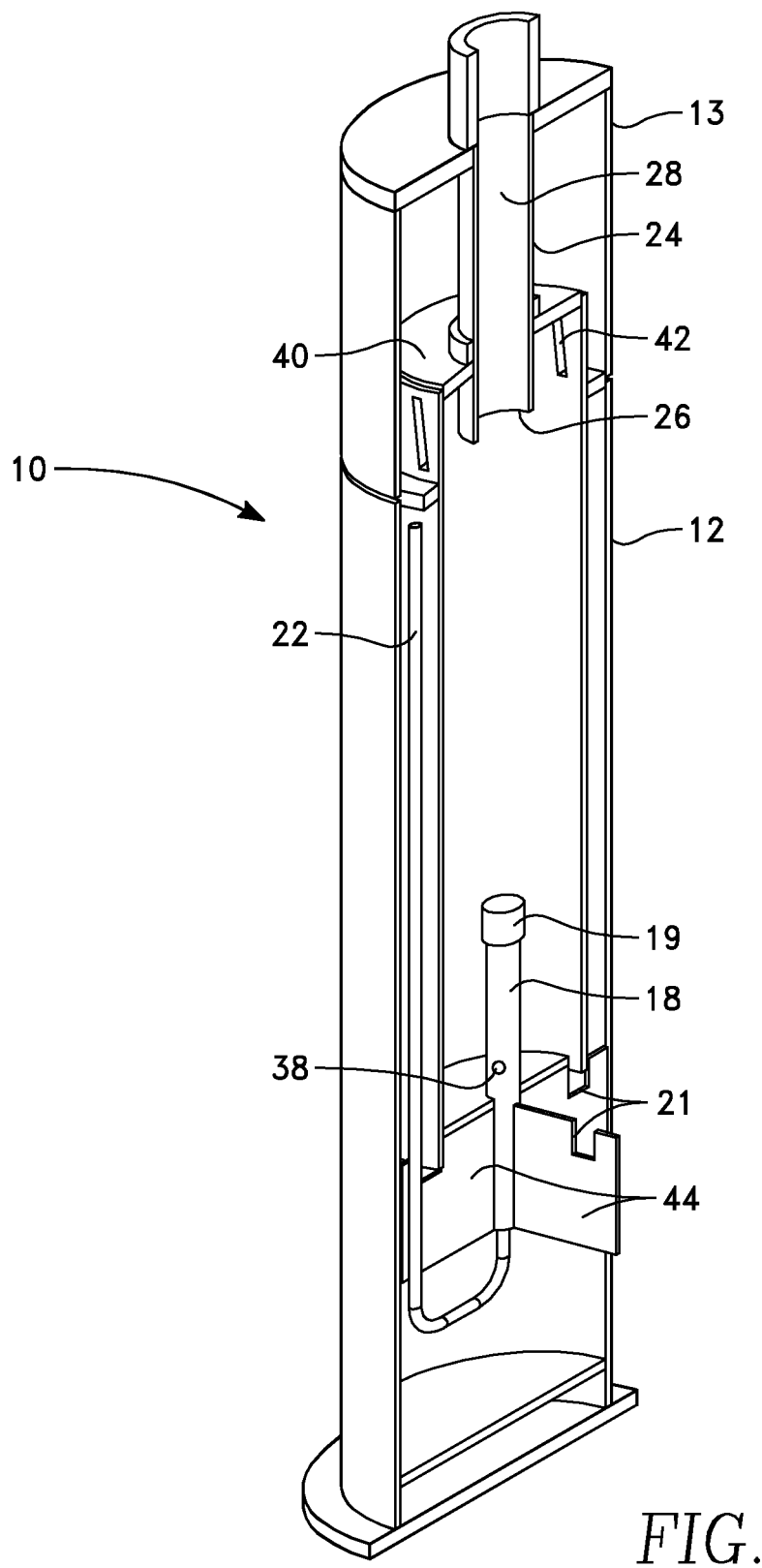
FIG. 2 is an isometric, partially cut-away side of one embodiment of a centrifugal separator of the present invention.
Figure 3:
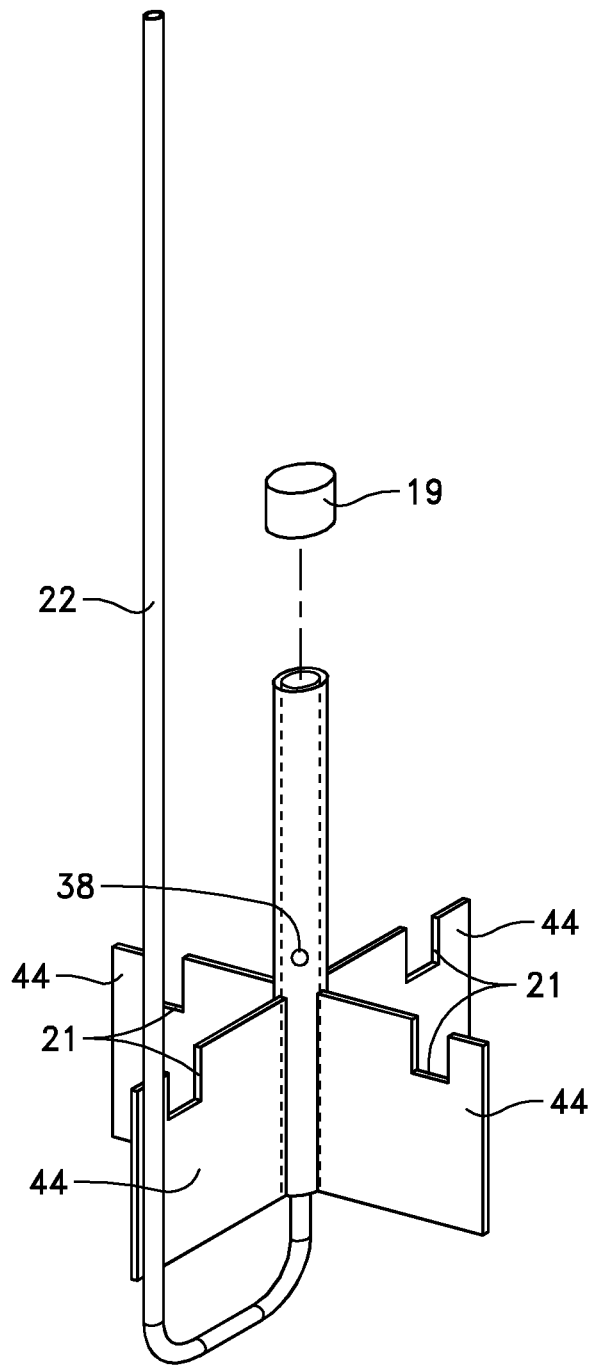
FIG. 3 is a perspective view of one embodiment of the j-tube, post, and centering fins of the present invention.
Figure 4:
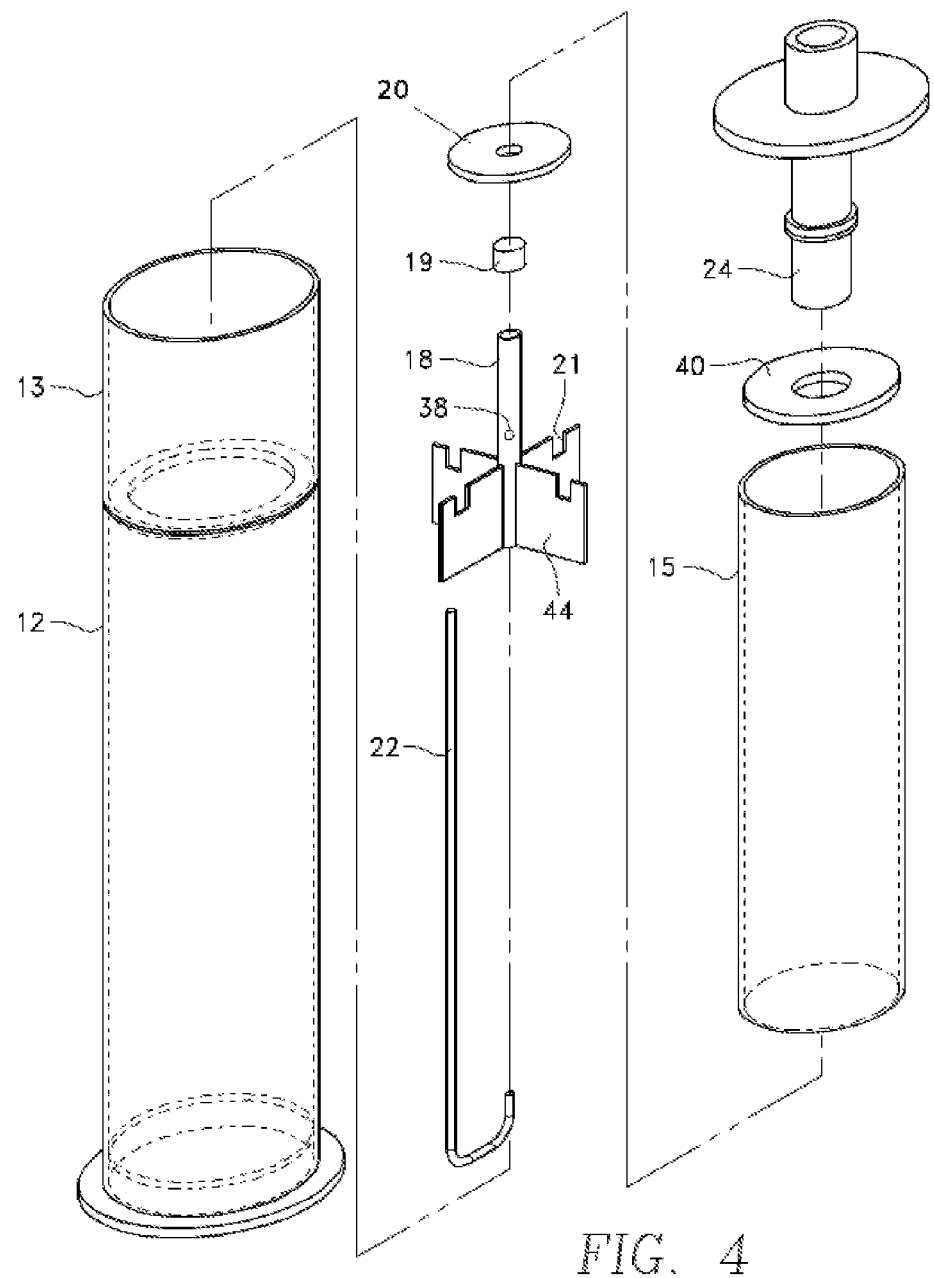
FIG. 4 is an exploded view of one embodiment of a centrifugal separator of the present invention.

Turning now to the drawings, wherein like numerals indicate like parts, the numeral 10 refers generally to a centrifugal separator of the present invention. Centrifugal separator 10 includes generally cylindrical walls 12 and 13 that serve as outer housings of the separator. Cylindrical walls 12 and 13 extend along a central axis and define an interior space for encompassing other components of the present invention. Upper cylindrical wall 13 defines an acceptance chamber and forms a housing for the upper portion of the device, whereas lower cylindrical wall 12 serves as a housing for the portion of the device lower than upper cylindrical wall 13.

Within cylindrical walls 12 and 13, separation barrel 15 extends along a central axis and forms a separation chamber 14 therein. Separation barrel 15 is disposed primarily within cylindrical wall 12, an upper portion of separation barrel 15 extending into the space defined by upper cylindrical wall 13. Annular plate 40 encircles an upper portion of separation barrel 15, being in fluid-sealing engagement with cylindrical walls 12 and 13 and separation barrel 15, such that fluid does not flow from acceptance chamber 34 (described below) between separation barrel 15 and cylindrical wall 12. As noted above, in the embodiment of the present invention shown in the figures, cylindrical wall 12 is divided by annular plate 40 into an upper cylindrical wall 13 and a lower cylindrical wall 12. It is contemplated, however, that a single cylindrical wall may be provided extending along the entire device, or that the cylindrical wall may be divided into more than two portions. An upper portion of separation barrel 15 extends into the area defined by upper cylindrical wall 13. At or near the bottom of separation chamber 14 is a spin plate 20 that extends normal to the central axis across separation chamber 14.

At or near the top of centrifugal separator 10 is an acceptance chamber 34 defined by upper cylindrical wall 13 and the upper portion of separation barrel 15. An inlet 30 extends through upper cylindrical wall 13 and into acceptance chamber 34. A solids-laden stream of fluid enters acceptance chamber 34 via inlet 30. Inlet 30 is preferably oriented in such a manner as to create a circular flow within acceptance chamber 34. The upper wall of separation barrel 15 includes slots 42 or other openings to allow the solids-laden stream of fluid to flow into separation chamber 14.

Slots 42 are preferably tangentially-directed slots that discipline the stream entering acceptance chamber 34. The stream that enters acceptance chamber 34 via inlet 30 passes into separation barrel 15 through slots 42 and streams downward along the walls of the defined separation chamber 14. This stream preferably flows through separation chamber 14 in a vortex. It is desirable to reduce the turbulence of the stream entering separation barrel 15 so that the particles disposed within the stream have as little velocity angular to the stream direction as possible. Slots 42 of the present invention minimize this turbulence as the stream enters separation barrel 15.

A collection chamber 16 is defined by cylindrical wall 12 beneath spin plate 20, at or near the bottom of cylindrical wall 12 and extending along the space between separation barrel 15 and lower cylindrical wall 12. Collection chamber 16 collects solids or a fluid flow that is much-enriched in solids. Drain port 36 is located near the bottom of cylindrical wall 12 and extends therethrough, providing a path for flow from collection chamber 16 out of centrifugal separator 10. Solids and solids-rich fluids from collection chamber 16 may be withdrawn from collection chamber 16 continuously, or at desired intervals. A removable plug may be provided for use when withdrawal of solids or solids-rich fluid is intermittent.

Solids and solids-laden fluids enters collection chamber 16 preferably by passing through a gap between spin plate 20 and the wall of separation barrel 15 and by passing through spaced-apart centering fins 44. The gap extends through the bottom of separation barrel 15, providing a flow route into collection chamber 16. While this is a preferred embodiment of the present device, it is contemplated that separation barrel 15 may be closed at the bottom and may include slots or other openings at the bottom thereof for the flow of solids or solids-laden fluid therethrough. Centering fins 44 include notches 21 on upper edges thereof. Notches 21 allow solids-laden fluid flow coming through the annular slot between spin plate 20 and the wall of collection chamber 16 to come further into the collection chamber before reaching fins 44. This helps reduce re-entrainment of solids meeting fins 44 prematurely and being directed back into the separation chamber. Fins 44 serve to knock the spin down and encourage solids to settle in collection chamber 16 by reducing fluid velocities in collection chamber 16.

The upper end of separation chamber 14 is closed and has an exit tube 24 extending therethrough, passing through acceptance chamber 34, defined by upper cylindrical wall 13, and out of the device. Exit tube 24 has an open end 26 and a central passage 28 to allow movement of treated fluid out of separation chamber 14. Exit tube 24 extends downward into separation chamber 14 along its central axis such that water reflected upward by spin plate 20 flows into open end 26 of exit tube 24. An annular region between exit tube 24 and the interior wall of separation chamber 14 receives the solids-laden stream moving upward through the separation chamber. The outer wall of exit tube 24 serves to restrain the stream as it enters separation barrel 14, and separates it from the upward central flow of fluid. The fluid reflected upward by spin plate 20 is the fluid traveling through J-tube 22, as described below.

The solid portion of material within collection chamber 16 can settle, leaving a partially-clarified supernatant at or near the top of collection chamber 16. This partially-clarified supernatant typically has a low concentration of solids. The partially-clarified fluid from collection chamber 16 enters separation chamber 14 via J-tube 22, the fluid flow into post 18 exiting through one or more openings 38. As fluid flow spins around post 18, a low-pressure area is created according to Bernoulli's Law. The pressure at the lower portion of post 18 is much lower than the pressure within collection chamber 16. The top of J-tube 22 opens near the top of collection chamber 16, as shown in FIG. 1. Because of the pressure difference existing between the area around post 18 and the top of J-tune 22, fluid is pulled into separation chamber 14 through J-tube 22 and openings 38 therein.

As noted above, fluid traveling through J-tube 22 is directed to post 18, which includes a central passage running therethrough. The fluid travels along the length of post 18, through the central passage thereof, and emerges through openings 38 into separation chamber 14 where the separation process of the present device is undertaken. The fluid stream emerging from post 18 is directed to the highest-spinning portion of separation chamber 14, thus having a high probability of being re-separated (any particles entering separation chamber 14 via J-tube 22 have already been separated in separation chamber 14 once). The presence of J-tube 22 encourages fine particles existing near the slot between separation chamber 14 and spin plate 20 to enter into collection chamber 16 rather than being pulled into the upward stream leaving separation chamber 14. The J-tube flow assists in pulling these particles into the collection chamber, since whatever flow rate is occurring through the J-tube occurs through the annular slot around spin plate 20. Thus, the presence of J-tube 22 enhances fine particle removal. The addition of post 18 helps keep the vortex in separation chamber 14 centered and ensures that it occupies the central portion of separation chamber 14, keeping particles from inadvertently being pulled into the center of the vortex.

The separation of solids from liquids is derived from fields of g force. If the solids/liquid stream passing through this invention were permitted to stand still for a sufficient length of time, the solids of sizes greater than colloidal would ultimately settle out. Heavier particles would separate more quickly than finer particles. Even in a swiftly moving stream, gravitational forces are effective for the separation of the particles from the liquid and for the segregation by size as they separate.

Similar separations are attained when the forces are other than gravity forces in a still environment. In particular, the very large centrifugal forces that are exerted in a centrifugal separation chamber cause much faster, more efficient separation.

The stream from J-tube 22 is preferably injected into the separation barrel at high velocity, exiting post 18 at one or more openings 38, just above the level of spin plate 20. The injected fluid whirls as a swiftly flowing, helically moving stream from its upper end to its lower end. In the separation barrel, the centrifugal forces are much greater than the gravitational force. The smaller the diameter, the greater the centrifugal force becomes for the same linear speed along the inner surface of the barrel. Clean fluid, having had particles separated from it in separation chamber 14, leaves the device via exit tube 24. Solid particles separated from the fluid stream within separation chamber 14 join the stream of fluid flowing from acceptance chamber 34 to collection chamber 16 along the walls of separation chamber 14.

As noted above, in existing centrifugal separation chambers, the vortex created within separation chamber 14 has a tendency to become off-centered with respect to the chamber. The tip of the vortex has a natural tendency to wander due to the significant forces at work in creating and maintaining the vortex. Further, as the vortex shifts, particles are able to enter the central region of the chamber and exit via exit tube 24. Post 18 serves to center the vortex created within separation chamber 14, ensuring that the vortex remains on-center and that the separation processes within separation chamber 14 remain smooth. Further, the presence of post 18 prevents particles from entering the central region of the vortex and leaving separation chamber with clean fluid through exit tube 24. As shown in the figures, post 18 is an extension of J-tube 22 that extends beyond spin plate 20 and into separation chamber 14. It is preferred that post 18 have the same internal diameter as J-tube 22, though it is contemplated that the diameter may be varied as desired. Likewise, the length of post 18 may also be varied. It is preferred, however, that openings 38, through which fluid exists post 18 and enters separation chamber 14, are located substantially near spin plate 20 rather than further along the length of post 18. It should be noted that post 18 preferably includes a cap 19, such that fluid flowing therethrough may exit only through openings 38.

It is to be understood that the description above, as well as the accompanying figures, are directed to exemplary embodiments of the present invention. Various modifications to that described above and shown in the figures will be readily apparent to those of skill in the art upon reading this disclosure. It is contemplated that such modifications remain within the spirit and scope of the present invention.

Having thus described the preferred embodiment of the invention, what is claimed as new and desired to be protected by Letters Patent includes the following:

1. A centrifugal separator comprising:
    a separation barrel with an upper end, a lower end, a central axis, and a circularly cylindrical axially extending wall defining a separation chamber;
    a spin plate extending substantially across said separation chamber adjacent to said lower end;
    a post comprising a central passage and extending from said spin plate Into the separation barrel and along the central axis thereof, the post defining at least one opening along the longitudinal wall thereof for allowing fluid to flow from the central passage of the post Into the separation chamber, wherein the upper end of said post is closed;
    an inlet in fluid communication with said separation chamber for allowing flow of a solids-laden fluid thereinto;
    a first conduit in fluid communication with said separation barrel for allowing flow of a substantially clean fluid out of said separation chamber;
    a cylindrical wall extending around the separation barrel and defining an acceptance chamber above the separation barrel and a collection chamber below the separation barrel; and
    a second conduit extending from a bottom of the post, and in fluid communication therewith, a top of said conduit being open such that fluid In said collection chamber can flow into the second conduit and be delivered to the separation chamber via the at least one opening along the longitudinal wall of the post.

2. A centrifugal separator comprising:
    a separation barrel with an upper end, a lower end, a central axis, and an Internal circularly cylindrical axially extending wall defining a separation chamber;
    a spin plate extending substantially across said separation chamber adjacent to said lower end;
    a post comprising a central passage and extending from said spin plate into the separation barrel and along the central axis thereof, the post defining at least one opening in a longitudinal wall thereof for allowing fluid to flow from the central passage of the post into the separation chamber, wherein the upper end of said post is closed;
    an inlet in fluid communication with said separation chamber for allowing flow of a solids-laden fluid thereinto;
    a first conduit in fluid communication with said separation barrel for allowing flow of a substantially clean fluid out of said separation chamber;
    a second conduit extending from a bottom of said post and in fluid communication therewith, to an upper portion of a collection chamber at a point higher than the at least one opening defined by said post, a top of said second conduit being open such that fluid in said collection chamber can flow into said conduit and be delivered to the separation chamber via the at least one opening in said post; and a plurality of spaced-apart fins attached to said post at a point beneath said spin plate.

3. The device according to claim 2, wherein at least one of the plurality of spaced-apart fins comprises a notch In an upper edge thereof.

4. A method of separating particulates from a solids-laden fluid stream, the method comprising the steps of:

introducing a solids-laden fluid stream into a centrifugal separator comprising:

a separation barrel defining a separation chamber in which the solids-laden fluid stream rotates, separating particulates therefrom by centrifugal force;

a cylindrical wall extending around the separation barrel and defining a collection chamber below the separation barrel and along a length thereof, between the separation barrel and the cylindrical wall;

a spin plate extending substantially across said separation chamber adjacent to a lower end thereof;

a post comprising a central passage and extending from said spin plate into the separation barrel and along a central axis thereof, the post having a longitudinal wall and an upper end and defining at least one opening along the longitudinal wall thereof for allowing fluid to flow from the central passage of the post into the separation chamber, wherein the upper end of said post is closed;

a first conduit In fluid communication with said separation barrel for allowing flow of a substantially clean fluid out of said separation chamber;

a second conduit extending from the bottom of the post, and in fluid communication therewith, to an upper portion of the collection chamber at a point higher than the at least one opening defined in said post, the top of the second conduit being open such that fluid in said collection chamber can flow into said second conduit and be delivered to the separation chamber via the at least one opening in said post;

allowing partially-clarified fluid In said collection chamber to re-enter the separation chamber by traveling along said conduit and exiting said post through said at least one opening therein;

separating further by centrifugal force the partially-clarified fluid entering the separation chamber from said post; and drawing clarified fluid from said separation chamber.

* * * * *